(12) United States Patent
Aggarwal et al.

(10) Patent No.: US 11,675,417 B2
(45) Date of Patent: Jun. 13, 2023

(54) EXECUTING ACTIONS BASED UPON TRANSFORMED INPUTS

(71) Applicant: International Business Machines Corporation, Armonk, NY (US)

(72) Inventors: Pooja Aggarwal, Bangalore (IN); Prateeti Mohapatra, Bangalore (IN); Malolan Chetlur, Jakkur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/095,657

(22) Filed: Nov. 11, 2020

(65) Prior Publication Data

US 2022/0147136 A1 May 12, 2022

(51) Int. Cl.
*G06F 3/01* (2006.01)
*G06N 5/04* (2023.01)

(52) U.S. Cl.
CPC ........ *G06F 3/01* (2013.01); *G06N 5/04* (2013.01)

(58) Field of Classification Search
CPC ............ H04L 63/1425; H04L 43/0876; H04L 63/0209; H04L 63/1441; H04L 67/12; H04L 63/101; H04W 12/08; H04W 12/12; H04W 12/128; H04W 4/70; G06F 3/01; G06N 5/04
See application file for complete search history.

(56) References Cited

U.S. PATENT DOCUMENTS

| 6,370,648 | B1 * | 4/2002 | Diep ................. G06F 21/55 706/13 |
| 9,112,895 | B1 * | 8/2015 | Lin ................. H04L 63/1425 |
| 9,405,379 | B2 | 8/2016 | Abzarian et al. |
| 10,048,804 | B2 | 8/2018 | Wang et al. |
| 10,318,072 | B2 | 6/2019 | Hwang et al. |
| 10,452,174 | B2 | 10/2019 | Westerman et al. |
| 2016/0156771 | A1 * | 6/2016 | Lee ................. G06V 40/28 455/414.1 |
| 2016/0171804 | A1 * | 6/2016 | Chaar ................. G06F 3/016 340/5.52 |
| 2017/0097733 | A1 | 4/2017 | Edgar et al. |
| 2017/0201541 | A1 | 7/2017 | Kapoor et al. |
| 2020/0081516 | A1 * | 3/2020 | Zyskind ............ G06F 3/04883 |

FOREIGN PATENT DOCUMENTS

| CN | 104636054 A | 5/2015 |
| RU | 2607271 C2 | 1/2017 |

* cited by examiner

*Primary Examiner* — Sahlu Okebato
(74) *Attorney, Agent, or Firm* — Ference & Associates LLC

(57) ABSTRACT

One embodiment provides a method, including: identifying, utilizing one or more sensors operatively coupled to the smart device, a user operating a smart device; inferring, based upon the identifying the user, a knowledge level of the user with respect to the smart device; determining, based in part on the knowledge level of the user, at least one input within a plurality of inputs provided by the user is anomalous with respect to a pattern of inputs utilized to execute a command; transforming, based upon the anomalous at least one input and the pattern, the plurality of inputs to a plurality of inputs matching the pattern of inputs; and executing an action based upon the transformed plurality of inputs.

13 Claims, 3 Drawing Sheets

EXECUTING ACTIONS BASED UPON TRANSFORMED INPUTS

BACKGROUND

The use of smart devices is becoming more and more common. However, by nature, smart devices can perform many different commands and often include many different ways for getting the device to perform a desired command. In other words, inputs that result in a desired command can be provided in multiple ways. For example, when sending a text message via a smart phone, a user may elect to type the message out, use a voice-to-talk technique, use a single slide and drag technique, and the like. Each of these input techniques results in a different series of inputs that are necessary for performing the desired command.

Additionally, smart devices also commonly permit the use of such a device to multiple users at once. For example, the use of a digital personal assistant may receive commands from more than one user within an environment at the same time. Allowing multiple users to simultaneously use the device may result in the smart device completing multiple individual tasks and/or completing a single task with command input from multiple users. The use of a smart device allows a user to complete a plurality of tasks in a quick and easy manner.

BRIEF SUMMARY

In summary, one aspect of the invention provides a method, including: identifying, utilizing one or more sensors operatively coupled to the smart device, a user operating a smart device; inferring, based upon the identifying the user, a knowledge level of the user with respect to the smart device; determining, based in part on the knowledge level of the user, at least one input within a plurality of inputs provided by the user is anomalous with respect to a pattern of inputs utilized to execute a command; transforming, based upon the anomalous at least one input and the pattern, the plurality of inputs to a plurality of inputs matching the pattern of inputs; and executing an action based upon the transformed plurality of inputs.

Another aspect of the invention provides an apparatus, comprising: at least one processor; and a computer readable storage medium having computer readable program code embodied therewith and executable by the at least one processor; wherein the computer readable program code comprises code that causes the processor to identify, utilizing one or more sensors operatively coupled to the smart device, a user operating a smart device; wherein the computer readable program code comprises code that causes the processor to infer, based upon the identifying the user, a knowledge level of the user with respect to the smart device; wherein the computer readable program code comprises code that causes the processor to determine, based in part on the knowledge level of the user, at least one input within a plurality of inputs provided by the user is anomalous with respect to a pattern of inputs utilized to execute a command; wherein the computer readable program code comprises code that causes the processor to transform, based upon the anomalous at least one input and the pattern, the plurality of inputs to a plurality of inputs matching the pattern of inputs; and wherein the computer readable program code comprises code that causes the processor to execute an action based upon the transformed plurality of inputs.

An additional aspect of the invention provides a computer program product, comprising: a computer readable storage medium having computer readable program code embodied therewith, the computer readable program code being executable by a processor; wherein the computer readable program code comprises code that causes the processor to identify, utilizing one or more sensors operatively coupled to the smart device, a user operating a smart device; wherein the computer readable program code comprises code that causes the processor to infer, based upon the identifying the user, a knowledge level of the user with respect to the smart device; wherein the computer readable program code comprises code that causes the processor to determine, based in part on the knowledge level of the user, at least one input within a plurality of inputs provided by the user is anomalous with respect to a pattern of inputs utilized to execute a command; wherein the computer readable program code comprises code that causes the processor to transform, based upon the anomalous at least one input and the pattern, the plurality of inputs to a plurality of inputs matching the pattern of inputs; and wherein the computer readable program code comprises code that causes the processor to execute an action based upon the transformed plurality of inputs.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
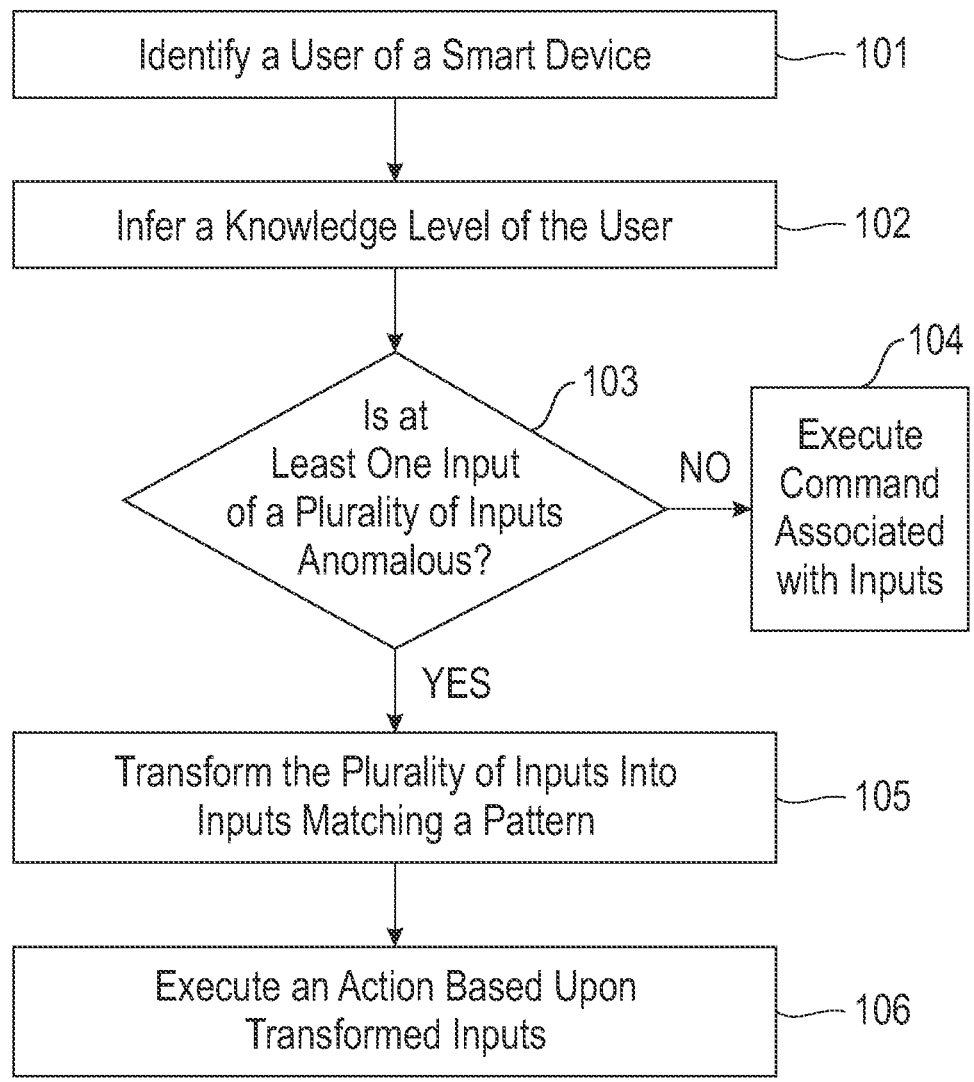
FIG. 1 illustrates a method of transforming a plurality of inputs into a series of inputs that can perform a command based upon identifying the user of the smart device, the knowledge of the user, and determining the plurality of inputs includes an anomalous input.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

First time users or users who are unfamiliar with operating smart devices, operating a particular smart device, or the like, face several common difficulties when using a smart device. One common difficulty is the lack of knowledge on how to perform a desired command. In other words, the user may know the desired end goal or command but is unsure of the series of inputs that are necessary for executing the desired end goal or command. Another common problem is touching multiple keys at the same time while operating a smart device. For example, a user may be attempting to press one area of the smart device, particularly one with a touch screen, and may inadvertently touch the incorrect area or multiple areas concurrently. Conventionally, the only way to overcome these issues is to ask other users how to perform a desired command, practice using the device so miscues do not occur, and simply using the device to learn different features and functions.

Accordingly, an embodiment provides a system and method for transforming a plurality of inputs into a series of inputs that can perform a command based upon identifying the user of the smart device, the knowledge of the user, and determining the plurality of inputs includes an anomalous input. In other words, the described system and method provides a filter operation that identifies the user of the smart device, identifies the level of knowledge of the user with respect to the smart device, and transform anomalous inputs into inputs that actually map to a desired command. The system identifies the user operating the smart device and infers the knowledge level of the user with respect to the smart device.

The system then determines that at least one input provided by the user is anomalous with respect to a pattern of inputs utilized to execute a command. In other words, the system is able to determine that a series of inputs that the user has or is providing is not mapping to a particular command and, therefore, includes anomalous input. The system may be able to infer the end goal of the user and may, based upon the end goal, identify that the inputs the user is providing does not match the pattern of inputs necessary for performing the end goal. An anomalous input may also be determined based upon the user who is operating the device. For example, while the inputs may accurately map to a command, the system may recognize the command as one that is not allowed by the user, for example, a child placing a phone call. Based upon identifying the anomalous input, the system transforms the inputs into a series of inputs that match a pattern of inputs. For example, the system can transform the inputs into a series of inputs that fulfills the end goal of the user. The system may then execute an action based upon the transformed inputs. The action may include executing the command that maps to the transformed inputs. The action may also include an action that is different than the command. For example, in the case that a user is attempting to execute a command that is not allowed for that user, the system may ignore the command.

Such a system provides a technical improvement over current systems for smart device command execution by use of a filtering technique. The system is able to correct inputs provided by a user in order to provide a more user friendly operating experience. The system utilizes a filtering technique to filter out unintended or unwanted inputs and also uses a technique that is able to infer an end goal and transform provided inputs into inputs that would accomplish the end goal. Thus, the system assists a user in performing a desired command without the user having to know the exact steps for performing the command. Additionally, the system provides a smart lock-type technique that can prevent users from performing commands that are inappropriate or indicated as not allowed for the particular user. Thus, unlike conventional systems that result in confusion and frustration for users, the described system allows a more user friendly operating experience. Rather than accepting all inputs provided on a smart device, a system and method is able to determine which inputs should not be included based upon the end goal, or may perform a transformation of the provided inputs into correct input for performing the command. Additionally, conventional techniques are unable to determine which command inputs are acceptable and which are to be denied. Further, conventional techniques are unable to use a user signature to assist in recognizing a pattern associated with the accepted command input and past usage of the smart device.

FIG. 1 illustrates a method for transforming a plurality of inputs into a series of inputs that can perform a command based upon identifying the user of the smart device, the knowledge of the user, and determining the plurality of inputs includes an anomalous input. At 101 the system may identify the user of a smart device. The system may utilize sensors operatively coupled to the smart device to identify who is attempting to use the smart device. For example, a system may utilize a front facing camera of the smart device to capture an image of the user. The image could then be compared against stored images that have a corresponding identified user. As another example, the system may utilize audio inputs to identify a user. As another example, the system may utilize biometric information, for example, a fingerprint, retinal scan, or the like, to identify the user. Identifying the user of a smart device may be used later when determining whether inputs mapping to a command should be accepted at the smart device.

In identifying the user, the system may identify the particular user or simply identify characteristics about the user. For example, instead of identifying that a specific user is utilizing the device, the system may simply determine a characteristic of the user operating the device (e.g., age, whether the user is familiar to the device, a number of users operating the device, a current condition of the user, etc.) In other words, the system may identify a characteristic that may indicate permissions that the user has with respect to the device, a familiarity of the user with operating the device, a number of users attempting to operate the device at a single time, a condition of the user that may impair the user's operation of the device (e.g., the user being distracted, the user usually wearing glasses but not having them at the current time of operation of the device, the hands of the user being full, etc.), or the like.

Identifying the user may also include identifying a usage signature of the user operating the smart device. In an embodiment, a usage signature associated with the identified user may be stored on or accessible to the smart device. The usage signature may be created using past usage data of the user while operating the smart device. The usage signature may correspond to how a user operates the device, provides input to perform various commands, or the like. Thus, the usage signature may include recording past usage patterns associated with the user and commands provided by the user. The recorded past usage patterns may then be referenced when identifying a user based upon a user signature in the future. In other words, the system may capture a usage signature of a user operating the device and then compare this usage signature to stored usage signatures that are associated with identified users to identify the user.

The usage signature may be different based upon the modality of input that the user is utilizing. In other words, the user may have different usage signatures for audio input, keyboard input, touch screen input, stylus input, gesture input, and the like. The usage signature may include how hard a user presses input areas, how quickly a user provides inputs, how much of a finger touches the screen when providing input, a tilt of a stylus, how loudly the user provides audible inputs, and the like. Thus, the identifying the user may be based upon inferring the user based upon characteristics of input provided by the user. In other words, the system may capture characteristics of the input and compare them to saved characteristics. If the characteristics match saved characteristics that have an associated user, the system may then infer that user is currently operating the device.

Additionally, the system may determine or identify the environment surrounding the smart device. The environment that the device is located in may influence the commands accepted and/or the information that is output in response to performing a command. The system may use the environment to classify a runtime application type which may then influence what is required to run the application. For example, certain runtime applications may require additional permissions, be only accessed by certain individuals, or the like. The system may classify a runtime application type as official, personal-adults, personal-kids, a combination of environments, or the like, to determine the how a smart will operate. For example, if the system determines that the user is at work or in a professional environment, the system may classify applications as official. The environment may also be used to identify anomalous input.

At 102 the system may infer a knowledge level of the user with respect to the smart device. To infer the knowledge level of the user the system may determine if there is any past history of the user with respect to operating the device. The knowledge level may be based in part on the usage signature, if one is identified. The system may also utilize sensors, for example, audio capture sensor, image capture sensor, or the like, to identify a sentiment or feeling of the user at the time of providing input. For example, the system may capture an image of the user and determine that the face of the user appears to be frustrated, tentative, confused, or the like. This may indicate that the user is uncomfortable with using the device and, therefore, has a low-level knowledge of the device. As another example, the device may use a microphone to capture speech of the user that indicates the user is having trouble using the device, is unsure of the correct inputs, or the like. This may indicate that the user has a low-level knowledge of the device.

The system may also infer the knowledge level of the user based upon the inputs provided by the user and whether the inputs map to a command. To determine whether the inputs map to a command, the system may generate control flow graphs that include nodes corresponding to inputs and edges that map to relationships between commands. Each control flow graph corresponds to a command or end goal. Thus, each node and edge within the control flow graph illustrates an input required to perform the command and a relationship between inputs to reach the command. To generate the control flow graph the system may analyze the manual corresponding to the smart device. The device manual identifies those features and functions supported by the device. The manual also identifies the set of inputs that are needed to execute a particular command. Thus, the system can analyze and parse the manual to construct the control flow graph by identifying a command, assigning a control flow graph to that command, identifying the inputs needed to execute the command, assigning each of the inputs to a node or leaf within the control flow graph, identifying the correct order of the inputs, and creating edges between nodes based upon the correct order of the inputs.

If the user provides input that maps to some nodes for performing a command, the system may infer the user has some knowledge or a low-level knowledge of the device. If the provided inputs are provided in the order identified by the control flow graph, meaning the provided inputs have a correctly identified edge, the system may infer the user has a mid-level knowledge of the device. If the user is able to provide inputs in the correct order and correctly execute the command, the system may infer the user knows how to operate the device or has a high-level knowledge of the device.

At 103 the system determines whether at least one input within the plurality of inputs provided by the user is anomalous with respect to a pattern of inputs utilized to a execute a command. In other words, the system determines if the user has provided the correct inputs for executing a command. Determining if the input includes an anomalous input may be based upon the inferred knowledge level of the user, an identified end goal of the user, an assumed end goal of the user based upon at least some of the inputs matching a pattern of inputs, comparing the provided inputs to a control flow graph, a combination thereof, or the like. For example, if the system is making a determination of anomalous input based upon comparing the inputs to a control flow graph, the system may identify that an input is anomalous by determining that at least one of the inputs is not included in the control flow graph, was not provided in the order identified by the control flow graph, or the like.

As another example, if the system is making a determination of anomalous input based upon the knowledge level of the user, the system may determine the user has a low knowledge level and that the series of inputs do not map to the command desired by the user. In other words, in this example the inputs may correctly map to a command, however, the system identifies that the command is not the command desired by the user and, therefore, identifies the input as anomalous. This described example may be applicable even if the user has a high-level knowledge of the device. The system may also detect anomalous inputs based upon a frequency of the same input being provided. For example, a child may repetitively provide input to the same button without intending to perform a command.

If an input is not identified as anomalous at 103, the system may execute a command corresponding to the provided inputs at 104. If, on the other hand, at least one input is identified as anomalous at 103, the system may transform the provided inputs into inputs matching the correct pattern of inputs at 105. For example, the system may transform the provided inputs into the pattern of inputs found in the control flow graph corresponding to the command desired by the user. Transforming the input may include changing an input to a different input, ignoring an extraneous input, adding a missing input, or the like. In other words, transforming the input can include any manipulation that allows for correct execution of the command. Transforming the command may take into account different factors when determining how to transform the command. For example, the environment in which the smart device is located may influence the output, and thus the transforming of the accepted input to the corrected input. Other factors that may influence which command is selected may include the knowledge level of the user, the user signature of the user, the identified user, the determined end goal of the user, and the like.

Once the inputs are transformed at 105, the system may execute an action based upon the transformed inputs at 106. The executed action may be the command that has been identified. In other words, the system may execute the command. On the other hand, the action may be something different than executing the command. For example, since the system is able to determine, based upon the user or characteristics of the user, commands that are allowed by the user, the system may ignore or disregard instructions to execute particular commands. For example, if a user is not allowed to utilize a text messaging application and is attempting to execute the command of opening the text messaging application, the system may simply not open the text messaging application. The system may also provide a notification to the user that this command is not allowed. Other actions include providing a pop-up confirming that a command should be executed, providing a notification to another device that a command is being attempted at the device, or the like. Whether a command is executed or not may also be dependent on the environment of the user. For example, some commands may be correctly executed in a home environment, but will not be executed in a professional environment.

Figure 2:
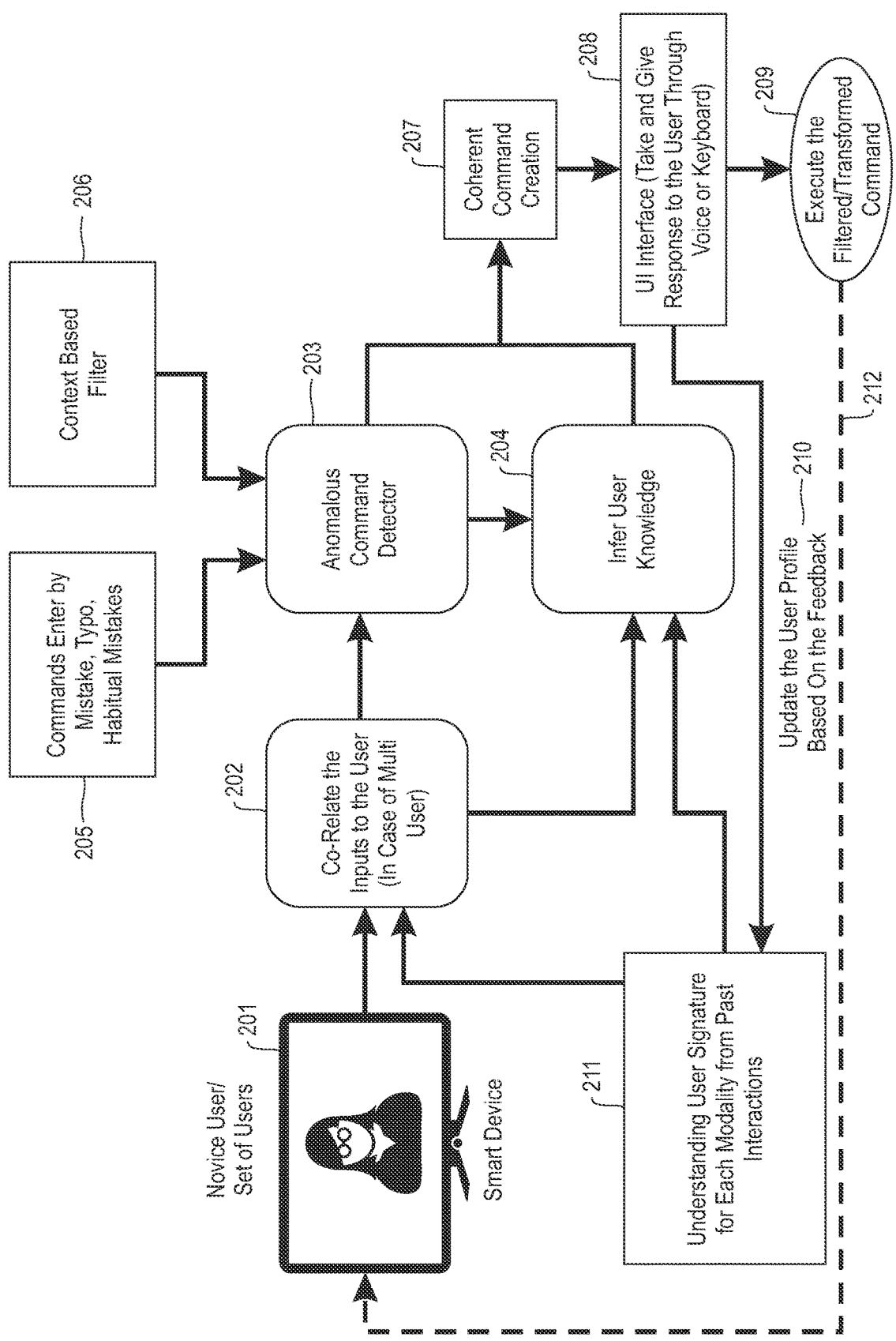
FIG. 2 illustrates an example system architecture for transforming a plurality of inputs into a series of inputs that can perform a command based upon identifying the user of the smart device, the knowledge of the user, and determining the plurality of inputs includes an anomalous input.

FIG. 2 illustrates a system architecture of the described system and method. A user provides input to a smart device at 201. At 202 the system may co-relate the inputs to the user. In an embodiment, there may only be one user utilizing a smart device. In another embodiment, more than one user may be attempting to use the smart device. In the event that multiple users are attempting to use the device, the system determines which user is providing which input at 202. The system utilizes an anomalous command detector at 203 to determine if any inputs provided by the user are anomalous. The anomalous command detector 203 can utilize a user signature 211 or control flow graph which may identify commands entered by mistake, typographical errors, habitual mistakes, or the like, 205. The anomalous command detector 203 may also use a context based filter 206 based upon the identified environment of the user.

The user signature 211, provided inputs 202, and anomalous command detector 203 may be used to infer a knowledge level of the user 204. The anomalous command detector 203 and knowledge level of the user 204 can then be used by the coherent command creation module 207 to create or transform the provided inputs into a correct series of inputs to execute a desired command. The user interface 208 may be utilized to respond to the user inputs, either through voice, keyboard, pop-up notifications, or the like. This response may include providing a notification or request for confirmation of identification of a particular command. The response of the user may be used to update the profile of the user 210. The system may then execute the filtered or transformed command at 209. Once the command is executed the user may be notified of the executed command at 212.

Figure 3:
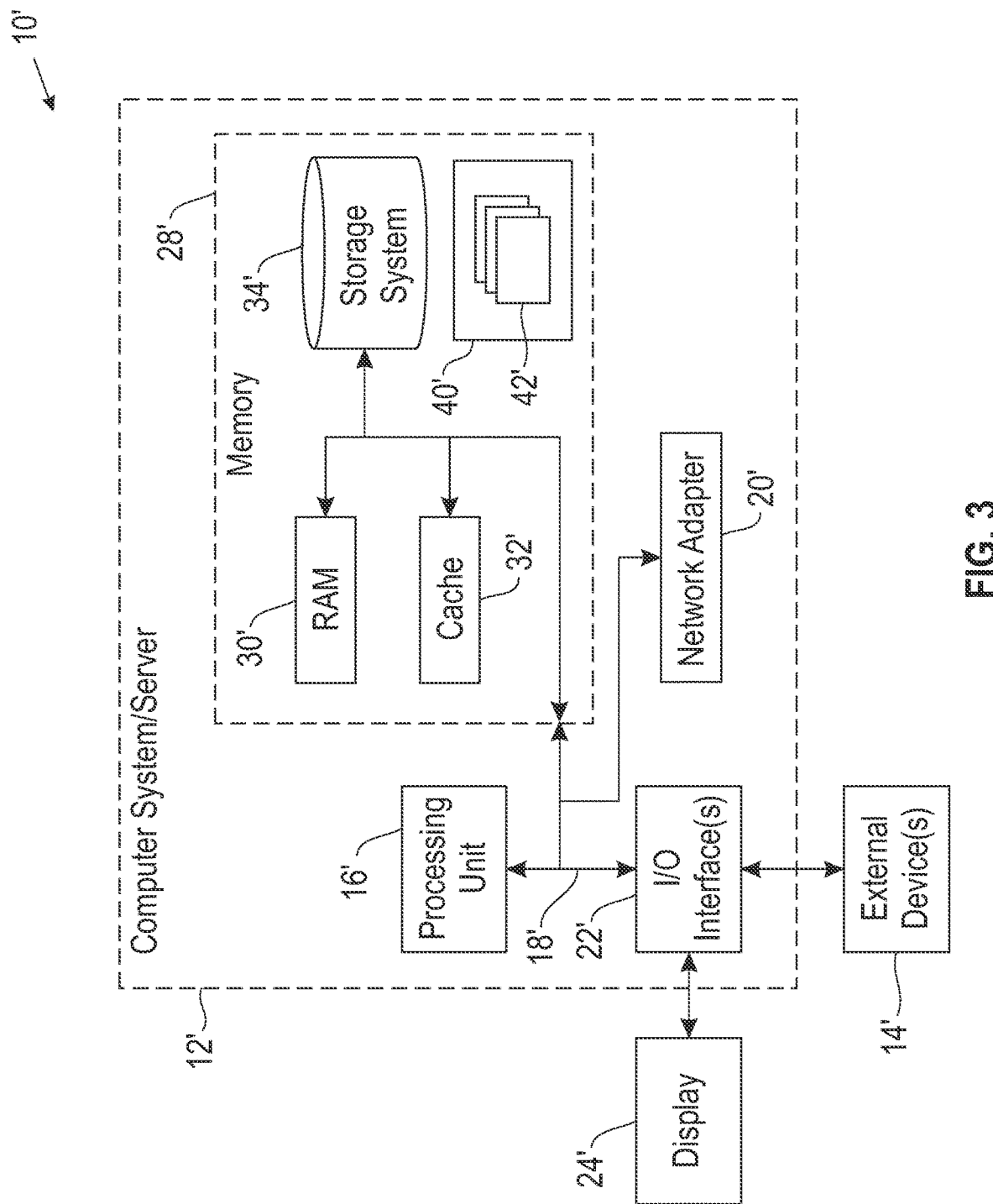
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
   identifying, utilizing one or more sensors operatively coupled to a smart device, a user operating the smart device, wherein the identifying comprises inferring the user based upon characteristics of input provided by the user, wherein the identifying comprises determining a usage signature of the user and comparing the usage signature to stored usage signatures associated with identified users, wherein the usage signature is based upon a modality of input to the smart device;
   inferring, based upon identifying the user, a knowledge level of the user with respect to the smart device, wherein the inferring the knowledge level comprises identifying a sentiment of the user when the user provides a plurality of inputs;
   determining, based in part on the knowledge level of the user, at least one input within the plurality of inputs is anomalous with respect to a pattern of inputs utilized to execute a command, wherein determining the at least one input is anomalous comprises constructing a plurality of control flow graphs, wherein each of the plurality of control flow graphs corresponds to a series of inputs utilized to execute a command supported by the smart device, wherein the constructing the plurality of control flow graphs comprises analyzing and parsing a manual of the smart device comprising a series of inputs needed to execute a command, wherein determining the at least one input is anomalous comprises determining the at least one input does not map to a series of inputs contained with the plurality of control flow graphs and wherein the determining comprises determining the at least one input is anomalous responsive to identifying the plurality of inputs does not execute a command the user is attempting to execute;
   transforming, based upon the at least one input determined as anomalous and the pattern of inputs, the plurality of inputs provided by the user to a plurality of inputs matching the pattern of inputs; and
   executing an action based upon the transformed plurality of inputs.

2. The computer implemented method of claim 1, wherein the inferring comprises determining at least a subset of the plurality of inputs map to a subset of inputs within at least one of the plurality of control flow graphs and identifying the knowledge level as a low knowledge level.

3. The computer implemented method of claim 1, wherein the inferring comprises determining the user has a low knowledge level.

4. The computer implemented method of claim 1, wherein the transforming comprises ignoring the at least one input determined as anomalous based upon determining the at least one input determined as anomalous comprises an extraneous input with respect to the pattern of inputs and wherein the executing an action comprises executing the command.

5. The computer implemented method of claim 1, further comprising determining a usage environment of the smart device and wherein the determining is based upon the usage environment.

6. The computer implemented method of claim 1, wherein the executing an action comprises executing an action different from the command and being based upon the user.

7. An apparatus, comprising:
   at least one processor; and
   a computer readable storage medium having computer readable program code embodied therewith and executable by the at least one processor;
   wherein the computer readable program code comprises code that causes the processor to identify, utilizing one or more sensors operatively coupled to a smart device, a user operating the smart device, wherein the computer readable program code that identifies comprises inferring the user based upon characteristics of input provided by the user, wherein the code that causes the processor to identify comprises determining a usage signature of the user and comparing the usage signature to stored usage signatures associated with identified users, wherein the usage signature is based upon a modality of input to the smart device;
   wherein the computer readable program code comprises code that causes the processor to infer, based upon identifying the user, a knowledge level of the user with respect to the smart device, wherein the computer readable program code that infers the knowledge level comprises identifying a sentiment of the user when the user provides a plurality of inputs;

wherein the computer readable program code comprises code that causes the processor to determine, based in part on the knowledge level of the user, at least one input within the plurality of inputs is anomalous with respect to a pattern of inputs utilized to execute a command, wherein determining the at least one input is anomalous comprises constructing a plurality of control flow graphs, wherein each of the plurality of control flow graphs corresponds to a series of inputs utilized to execute a command supported by the smart device, wherein the constructing the plurality of control flow graphs comprises analyzing and parsing a manual of the smart device comprising a series of inputs needed to execute a command, wherein determining the at least one input is anomalous comprises determining the at least one input does not map to series of inputs contained with the plurality of control flow graphs and wherein the determining comprises determining the at least one input is anomalous responsive to identifying the plurality of inputs does not execute a command the user is attempting to execute;

wherein the computer readable program code comprises code that causes the processor to transform, based upon the at least one input determined as anomalous and the pattern of inputs, the plurality of inputs provided by the user to a plurality of inputs matching the pattern of inputs; and wherein the computer readable program code comprises code that causes the processor to execute an action based upon the transformed plurality of inputs.

8. A computer program product, comprising:

a computer readable storage medium having computer readable program code embodied therewith, the computer readable program code being executable by a processor;

wherein the computer readable program code comprises code that causes the processor to identify, utilizing one or more sensors operatively coupled to a smart device, a user operating the smart device, wherein the computer readable program code that identifies comprises inferring the user based upon characteristics of input provided by the user, wherein the code that causes the processor to identify comprises determining a usage signature of the user and comparing the usage signature to stored usage signatures associated with identified users, wherein the usage signature is based upon a modality of input to the smart device;

wherein the computer readable program code comprises code that causes the processor to infer, based upon identifying the user, a knowledge level of the user with respect to the smart device, wherein the computer readable program code that infers the knowledge level comprises identifying a sentiment of the user when the user provides a plurality of inputs;

wherein the computer readable program code comprises code that causes the processor to determine, based in part on the knowledge level of the user, at least one input within the plurality of inputs is anomalous with respect to a pattern of inputs utilized to execute a command, wherein determining the at least one input is anomalous comprises constructing a plurality of control flow graphs, wherein each of the plurality of control flow graphs corresponds to a series of inputs utilized to execute a command supported by the smart device, wherein the constructing the plurality of control flow graphs comprises analyzing and parsing a manual of the smart device comprising a series of inputs needed to execute a command, wherein determining the at least one input is anomalous comprises determining the at least one input does not map to series of inputs contained with the plurality of control flow graphs and wherein the determining comprises determining the at least one input is anomalous responsive to identifying the plurality of inputs does not execute a command the user is attempting to execute;

wherein the computer readable program code comprises code that causes the processor to transform, based upon the at least one input determined as anomalous and the pattern of inputs, the plurality of inputs provided by the user to a plurality of inputs matching the pattern of inputs; and wherein the computer readable program code comprises code that causes the processor to execute an action based upon the transformed plurality of inputs.

9. The computer program product of claim 8, wherein the inferring comprises determining at least a subset of the plurality of inputs map to a subset of inputs within at least one of the plurality of control flow graphs and identifying the knowledge level as a low knowledge level.

10. The computer program product of claim 8, wherein the inferring comprises determining the user has a low knowledge level.

11. The computer program product of claim 8, wherein the transforming comprises ignoring the at least one input determined as anomalous based upon determining the at least one input determined as anomalous comprises an extraneous input with respect to the pattern of inputs and wherein the executing an action comprises executing the command.

12. The computer program product of claim 8, further comprising determining a usage environment of the smart device and wherein the determining is based upon the usage environment.

13. The computer program product of claim 8, wherein the executing an action comprises executing an action different from the command and being based upon the user.

* * * * *